United States Patent [19]

Masuda et al.

[11] Patent Number: 5,221,552
[45] Date of Patent: Jun. 22, 1993

[54] PORRIDGELIKE DIETARY FIBER, FOODS CONTAINING THE SAME, AND METHOD FOR PRODUCING PORRIDGELIKE DIETARY FIBER

[75] Inventors: Akiyoshi Masuda, Obihiro; Soushiro Nomachi, Akashi; Tsutomu Aritsuka, Obihiro; Kunioki Kishida, Koube, all of Japan

[73] Assignees: Nihon Tensaiseito Kabushiki Kaisha, Tokyo; Daiwabo Create Co., Ltd., Osaka, both of Japan

[21] Appl. No.: 748,526

[22] Filed: Aug. 22, 1991

[30] Foreign Application Priority Data

Aug. 27, 1990 [JP] Japan ................... 2-222598

[51] Int. Cl.$^5$ ............................................ A23L 1/214
[52] U.S. Cl. ............................. 426/615; 426/804
[58] Field of Search ............................ 426/615, 804

[56] References Cited

U.S. PATENT DOCUMENTS

| | | | |
|---|---|---|---|
| 4,451,489 | 5/1984 | Beale | 426/804 |
| 4,770,886 | 9/1988 | Lee | 426/804 |
| 4,795,653 | 1/1989 | Bommarito | 426/637 |
| 4,882,190 | 11/1989 | Olson | 426/635 |
| 4,923,981 | 5/1990 | Weibel | 426/615 |
| 4,938,974 | 7/1990 | Bichsel | 426/615 |
| 4,992,288 | 2/1991 | Olson | 426/640 |
| 4,997,665 | 3/1991 | Grethlein | 426/542 |
| 5,008,254 | 4/1991 | Weibel | 426/615 |
| 5,043,171 | 8/1991 | Bichsel | 426/615 |

FOREIGN PATENT DOCUMENTS

| | | |
|---|---|---|
| 58-8827 | 1/1983 | Japan . |
| 58-20247 | 2/1983 | Japan . |
| 58-34104 | 2/1983 | Japan . |
| 61-103832 | 5/1986 | Japan . |
| 61-155331 | 7/1986 | Japan . |
| 62-51623 | 3/1987 | Japan . |
| 63-41543 | 2/1988 | Japan . |
| 63-216822 | 9/1988 | Japan . |
| 8809624 | 12/1988 | World Int. Prop. O. . |

*Primary Examiner*—Carolyn Paden
*Attorney, Agent, or Firm*—Oliff & Berridge

[57] ABSTRACT

A porridgelike dietary fiber prepared by finely grinding a wet beet pulp obtained by removing most of the water-soluble components from beet roots is disclosed. Processed foods added with such a porridgelike dietary fiber and a process for producing such a porridgelike dietary fiber are also disclosed.

7 Claims, 1 Drawing Sheet

100 μ

50 μ

PORRIDGELIKE DIETARY FIBER, FOODS CONTAINING THE SAME, AND METHOD FOR PRODUCING PORRIDGELIKE DIETARY FIBER

BACKGROUND OF THE INVENTION

1. Field of the Invention

The present invention relates to dietary fiber, in particular, a porridgelike dietary fiber prepared from beet. It also relates to foods containing such dietary fibers and to a method for producing a porridgelike dietary fiber.

2. Prior Art

With the rapid improvement in the standard of living in recent years, the eating habit in Japan has shifted to luxuries, and the consumption of highly purified or processed foods has increased. As a result, so-called Western-type adult diseases have been increasing.

Since the proposal of Burkitt's hypothesis on the interrelationship between the rectal cancer and meals, many studies have been made on the physiological functions of dietary fiber.

In recent years, dietary fiber has received an increasing attention, and it has been proved that dietary fiber is closely associated in terms of physiology with such adult diseases as rectal cancer, increase in the level of serum cholesterol, arterial sclerosis, diabetes, etc. New functions of dietary fiber have also been found, for example, inhibition of digested or absorbed of toxicity.

Since the recognition of the importance of dietary fiber as a diet factor that affects the human health, various dietary fiber derived from vegetables, root crops, fruits, cereals, etc. has been produced.

In usual cases, dietary fiber products are in the form of powders or granules and prepared by subjecting fibers separated from the above sources to drying, pulverization, classification, etc. Where necessary, the products are additionally subjected to an acid or alkaline treatment and/or bleaching with an appropriate bleaching agent.

The thus prepared dietary fiber products have an expansibility and a water holding property corresponding to their origin, and most of the products are consisted mainly of cellulose, hemicellulose, pectin and lignin.

Beet roots, which have been known as a raw material for sugar, can also be a useful source for dietary fiber, and many methods have been proposed for producing dry powders of dietary fiber from beet roots, wherein sugars and other water-soluble components are removed from the roots by means of immersion into warm water, and the residue is subjected to heating, drying, pulverization and classification (see, e.g., Japanese Patent Publication Nos. Sho 58-8827; Sho 58-20,247 and Sho 63-41,543).

It has also been proved that dietary fiber prepared from beet roots can be excellent in their functions relating to nutritional physiology (see, e.g., Japanese Patent Laid-Open Nos. Sho 61-103,832; Sho 61-155,331; Sho 62-51,623 and Sho 63-216,822).

Because of this, there have been proposed fiber-intensified foods prepared by blending beet root dietary fiber with other food materials since ingesting foods added with such a physiologically excellent dietary fiber contributes to the maintenance of human health by supplementing fibers, which may otherwise be present in foods in only sufficient quantities (see, e.g., Japanese Patent Publication No. Sho 58-34,104).

However, in the hitherto known fiber-intensified food products, dietary fiber prepared from beet roots is blended in the form of dried powder and hence could hardly be distributed uniformly, thus giving a rough mouthfeel to the resulting food products. In addition, food products blended with beet root dietary fiber have a slight unpleasant odor characteristic to beet roots, in particular, at the time when heated.

SUMMARY OF THE INVENTION

In view of the above, the inventors have conducted intensive studies on beet root dietary fiber, in particular, from the aspect of its physical properties, so as to improve the taste of food products blended with the fiber, while retaining its nutritional physiological functions, and as a result have completed this invention.

There is provided by this invention a porridgelike dietary fiber prepared by removing most of water-soluble components, such as sugars, from beet roots to form wet beet pulp; and subjecting the pulp to grinding to form finely ground fiber associated with water. In the porridgelike dietary fiber according to the invention, the solid fiber component is uniformly dispersed in water, in contrast to the prior dietary fiber powders prepared by subjecting beet pulp to drying, pulverization and classification.

There is also provided by this invention a food product added with such a porridgelike dietary fiber. The food product according to the invention can be free from the problems associated with food products intensified with beet dietary fiber, such as poor mouthfeel, inferior dispersion into food materials, and unpleasant odor upon heating.

This invention further provides a method for producing such a porridgelike dietary fiber.

BRIEF DESCRIPTION OF THE DRAWINGS

In FIG. 1 is shown a photomicrograph of beet dietary fibers according to prior art, and in FIG. 2 is shown a photomicrograph of porridgelike dietary fibers according to the invention. Both of the photomicrographs were taken after the fibers had been diluted with water and allowed to stand for 2 hours.

DETAILED DESCRIPTION OF THE PREFERRED EMBODIMENTS

Figure 1:
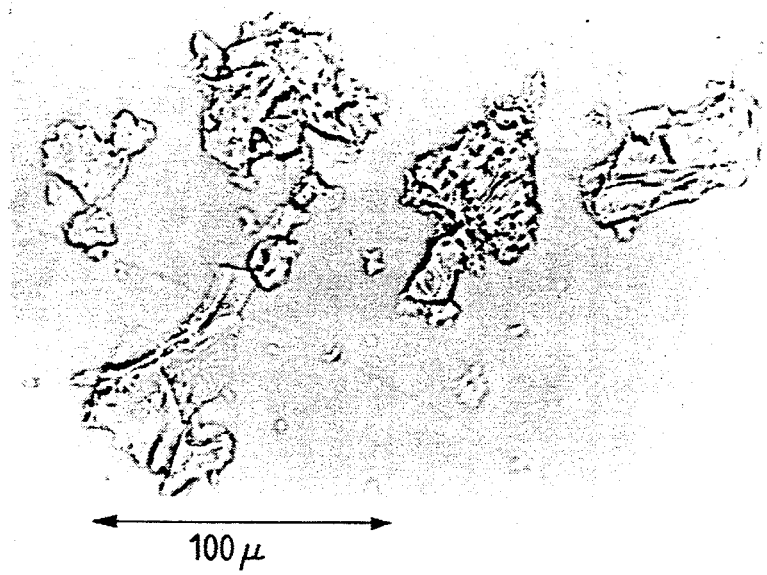
FIGS. 1 and 2 are photomicrographs illustrating the shape of dietary fibers obtained from beet roots.

The porridgelike dietary fiber according to the invention and the method for producing the same will be explained hereinbelow in detail.

The porridgelike dietary fiber is prepared from beet roots, which have been known as a source for sugar. Beet roots are cut into small pieces and subjected, e.g., to immersion into hot water, to remove most of water-soluble components, such as sugars, thereby leaving a residue, which in general is in the form of strips, dices or pulpy mass. In this specification, such a residue is referred to as "beet pulp". The residue or beet pulp may be directly subjected to grounding in a wet state, to form porridgelike dietary fiber. Alternatively, the beet pulp may be dried and redispersed into water before being subjected to grinding.

In a test, beet roots were cut into strips and treated with hot water of around 70° C. in an extraction apparatus according to the conventional method for producing beet sugar, and 20 kg of wet beet pulp having a water content of 91 to 92%, which was discharged, after removal of most of the water-soluble components, from the drain of the apparatus, was recovered. The wet beet pulp was divided into two portions. One portion (10 kg) was subjected to squeezing and dried up to a water content of 5%. The dried product was then pulverized with a hammer-type compact mill to give powders of 150 to 200 mesh (dietary fiber according to prior art). The other portion (10 kg) was subjected to grinding, using a mill designed for animal and fish meet processing (model MKZA 10-15 manufactured by Masuko Sangyo K.K.) with grinders MKGA 10-80#) set at a gap of 20μm, to give fine porridgelike dietary fiber (dietary fiber according to the invention). The components contained in the thus obtained dietary fibers are shown in Table 1.

TABLE 1

| Sample | Water (%) | Solid (%) | Dry Weight (%) | | | |
|---|---|---|---|---|---|---|
| | | | Pectin | Hemicellulose | Cellulose | Lignin |
| Dietary Fiber According to Prior Art | 5.2 | 94.8 | 19.0 | 22.0 | 23.1 | 2.9 |
| Dietary Fiber According to the Invention | 95.1 | 4.9 | 18.8 | 22.1 | 23.0 | 2.7 |

As can be seen from the table, there are no substantial differences in the components of the two dietary fibers. The components of dietary fiber is therefore not impaired by the grinding treatment according to the invention.

In another test, each of the dietary fibers prepared above was admixed with a predetermined quantity of water to observe their affinity with water. The dietary fiber according to prior art showed swelling based on its water retaining powder. However, it precipitated and formed no suspension in water. This shows that affinity of the fiber is insufficient. On the contrary, the dietary fiber according to the invention completely dispersed into water. This shows that the affinity with water of the fiber is sufficiently high.

The reason why their affinity with water is so different may be presumed as follows. In the dietary fiber according to the prior art, the residue obtained by removing most of the water-soluble components is simply dried and subjected to grinding. Cells are therefore not ruptured, and the structure that bonds the two major components constituting the dietary fiber (namely, water-soluble components, such as pectin and hemicellulose; and water-insoluble components, such as cellulose and lignin) remains without being broken. Because of this, the affinity with water of the resulting fiber becomes small. On the other hand, in the dietary fiber according to the present invention, many cells are ruptured when the fiber is finely ground in a wet state. As a result, the water-soluble components and the water-insoluble components are separated, and the affinity with water of the resultant fiber becomes high.

Figure 2:
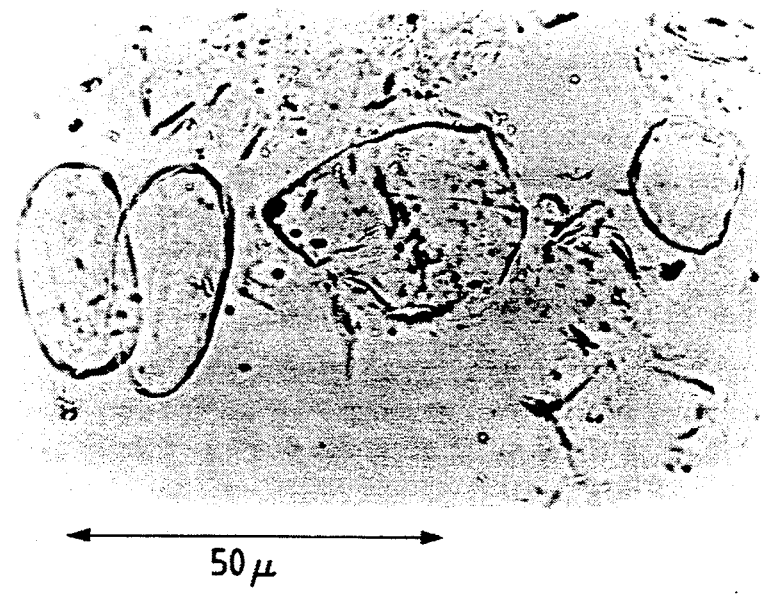

In order to illustrate the difference of the two dietary fibers more clearly, their photomicrographs are shown in FIGS. 1 and 2.

FIG. 1 is a microphotograph showing typical fibers (dried and pulverized product) according to prior art, and FIG. 2 is a microphotograph showing typical fibers (porridgelike ground product) according to the invention, both of the photographs being taken after the fibers had been diluted with water and allowed to stand for 2 hours. As is seen from the figures, the prior fibers derived from beet roots are in the form of rugged particles irrespective of their size, whereas most of the fibers according to the invention are in the form of smooth micro particles, and the rest of the fibers remained in larger sizes are also in the form of round particles having no rugged fringes.

These differences in their size and shape, it is presumed, may be an important factor for the good taste of the food added with the porridgelike dietary fiber according to the invention. The differences also seem to endorse the assumption described hereinabove.

As described hereinbefore, in the present invention, the beet pulp obtained after removing most of the water-soluble components from beet roots is subjected to grinding in a wet state. In another test, the procedure of the first test was repeated, except that the content of water in the beet pulp (91-92%) was adjusted before being ground. In Table 2 are shown dispersibility of the resultant fibers and the percentage of fine fibers contained therein. It would be seen from the table that a content of water in the range of 90 to 99% can be preferred for the grinding since the percentage of fine particles becomes smaller when the content of water is less than 90%.

TABLE 2

| | Content of Water in Wet State (%) | | | | |
|---|---|---|---|---|---|
| | 80 | 85 | 90 | 95 | 99 |
| Percentage of Fine Particles*[1] | 54 | 67 | 97 | 100 | 100 |
| Dispersibility*[2] | 62 | 75 | 98 | 100 | 100 |

[Notes]
*[1] The figures show percentage of fibers which passed through a sieve of 0.1 mm.
*[2] 100 ml of porridgelike dietary fiber is placed in a 100 ml measuring cylinder and allowed to stand for 1 hours, and then the volume of sedimented pulp portion was determined. The figures show percentage of the portion.

In the present invention, porridgelike dietary fiber is produced by grinding a wet beet pulp, of which water content is preferably in the range of 90 to 99%. It is possible to use dried beet pulp obtained by subjecting beet pulp discharged from a conventional extraction plant to squeezing and drying. In this case, the dried beet pulp is added, and fully swelled, with water up to a water content in the above range before it is subjected to grinding. It is also possible to cut or crush beet roots into pieces of an appropriate size and then extracted with hot water of 70° to 80° C. until the quantity of sugar contained in the extract becomes almost nil (sugar can be detected, e.g., with α-naphthol . The resulting product can be used after the content of water is adjusted within the above range of 90 to 99% (e.g., by means of dehydration or addition of water).

With regard to grinding, the use of the above-described mill (MKZA 10-15) can be preferred. It is however possible to use any other apparatuses, provided that the beet pulp can be finely ground and dispersed uniformly into water to produce a porridgelike product. As examples of other usable apparatuses, mention may be made of those comprising rotary propellers and spiral walls, and those utilizing stone mortars.

In the case where the mill (MKZA 10-15) is used, the pulp is ground with grinders set at a gap of 1 to 30μm, preferably 1 to 20μm.

The thus obtainable porridgelike dietary fiber assumes a white to grayish white color and is in a smooth viscous state where no particles can be sensed when felt with fingers. In spite of this, there is no difference in components contained in the dietary fiber according to the invention and those contained in the dietary fiber according to prior art, as shown in Table 1.

It is a matter of course that the dietary fiber according to the invention can be added to various foodstuffs to intensifies dietary fiber, which may otherwise be contained in only an insufficient quantity.

The present invention can be advantageous in that the water contained in the porridgelike dietary fiber can be utilized for the processing of foodstuffs. In the porridgelike dietary fiber according to the invention, fine fibers are uniformly dispersed in water, and the fibers and water are in a solvated state. It can therefore be preferred to add foodstuffs to the porridgelike fine dietary fiber according to the invention, rather than adding the dietary fiber to foodstuffs. After kneading, there are obtained food materials which can be processed into various processed foods. The thus obtainable processed food can be not only rich in fibers, but excellent in texture since they are free from the rough mouthfeel associated with the prior fiber-intensified foods.

In addition, processed foods blended with the dietary fiber according to the invention can be excellent in taste since they can be free from the characteristic slight odor often felt at the time when processed foods blended with fibers derived from beet roots are processed, in particular, heated.

The invention will be explained in further detail by way of examples.

EXAMPLE 1

To 100 kg of wet beet pulp (small strips having a water content of 91%)—which was discharged from a beet sugar extraction plant after most of the water-soluble components had been removed—was added water, to adjust its water content to 95%. The resulting pulp was ground for 30 minutes by using a mill (type NSM-37 manufactured by Nagasawa Kikai Seisakusho K.K.) set at a gap of 15μm, to obtain 180 kg of a porridgelike ground product.

The thus obtained porridgelike product assumed a grayish white color and passed entirely through a sieve of 0.1 mm. Physical properties of the product are shown in Table 3.

TABLE 3

| Particle Size Observed Under Microscope: | Less than 35 μm |
|---|---|
| Content of Water: | 95.3% |
| Total Solid Content: | 4.7% |
| Solid Contents | |
| Pectin | 18.9% |
| Hemicellulose | 22.1% |
| Cellulose | 23.2% |
| Lignin | 2.8% |

EXAMPLE 2

To 50 parts by weight of the porridgelike ground product prepared in Example 1 was added 1 part by weight of sodium carbonate. After being well admixed, the mixture was thoroughly kneaded, during which 100 parts by weight of wheat flour (semi-high gluten flour) was added thereto. The kneaded product or dough was allowed to ripe for 30 minutes, and noodles were prepared therefrom, using a noodle-making machine. The noodles were boiled with hot water for 3 minutes and then cooled with water of 10° C. The resultant noodle product (Chinese noodle) assumed a bright yellow color and contained the dietary fibers according to the invention in an amount of ca. 2 g (dried weight), per 100 g of noodles.

For the purpose of comparison, 2.5 parts by weight of a prior beet dietary fiber (size, 150 mesh or less; content of water, 6%) was well admixed with 100 parts by weight of wheat flour and 1 part by weight of sodium carbonate. After the addition of 48 parts by weight of water, the resulting mixture was thoroughly kneaded and processed in the same manner as above to give a Chinese noodle product (control). The thus obtained product assumed a dark yellow color and contained the beet dietary fiber in an amount of ca. 2 g, per 100 g of noodles.

The two noodle products were subjected to organoleptic tests by a panel of 10 male and female members. Results obtained are shown in Table 4.

As is seen from the table, the product according to the invention was superior to the control in all the items tested. The mouthfeel of the noodle product according to the invention was therefore markedly improved, compared with the case where the prior dietary fiber was incorporated.

TABLE 4

| Evaluated Items | Number of Panelists Voted for the Product of the Invention | Number of Panelists Voted for the Control Product |
|---|---|---|
| Feel to teeth | 17 | 3 |
| Smoothness | 19 | 1 |
| Flavor & Odor | 18 | 2 |
| Elongation by Soaking | 17 | 3 |
| Deformation upon Boiling | 17 | 5 |
| Tensile Strength[*1] | 64 g | 55 g |

[Note]
[*1] The figures show the tensile strength of a sheet (width, 15 mm; thickness, 2 mm) of dough corresponding to 5 lines of noodles, measured at a span of 50 mm and at a rate of 200 m/min by using a Shopper-type tensile tester (manufactured by Toyo Seiki K.K.).

EXAMPLE 3

The porridgelike ground product (500 g) prepared in Example 1 was admixed with 2 kg of surimi (ground meat) of pollock, and the mixture was kneaded by a siren cutter (Type-12 manufactured by Hanaki Seisakusho K.K.) for 1 minute at 1,750 r.p.m. To this were added 60 g of salt and 100 g of starch, and the mixture was kneaded for 3 minutes. The kneaded product (water content, 79.2%) was stuffed by a stuffer into a marketed polyvinylidene chloride tube (width in folded empty state, 48 mm) for food use. The stuffed tube was warmed at 40° C. for 20 minutes and then steamed at 90° C. for 30 minutes to give 2,530 g of kamaboko (fish sausage), which had a water content of 78.1% and contained the dietary fiber at a percentage of 0.9%.

For the purpose of comparison, a kamaboko product (water content, 72.4%) was prepared in the same manner as above, except that the ground dietary fiber was not added.

Both of the products were excellent although the water content of the former was a little greater than the latter, and there were no substantial differences in their brightness, hue, mouthfeel and taste. In resilience test, too, the two products were equally satisfactory.

EXAMPLE 4

Into 300 parts by weight of the porridgelike ground product prepared in Example 1 was dissolved 20 parts by weight of dry yeast. To this was added 650 parts by weight of wheat flour (high gluten flour), and the mixture was kneaded for 1 minute at a low speed and for 2 minutes at a medium speed at a temperature of 24±1° C. and then fermented for 4 hours at 27° to 28° C. To the resultant dough were added 400 parts by weight of the porridgelike ground product, 300 parts by weight of wheat flour (high gluten flour), 50 parts by weight of sugar, 20 parts by weight of salt and 50 parts by weight of shortening, and the mixture was kneaded for 1 minute at a low speed, for 2 minutes at a medium speed and for 4 minutes at a high speed at a temperature 27° to 28° C. and then allowed to stand for 20 minutes at the same temperature. The resultant dough was divided and shaped into a round shape. After 20 minutes of bench time, the pieces of doughs were subjected to a second fermentation for 50 minutes at 36° to 38° C. and then baked for 20 minutes at 205° to 210° C., to give loafs of bread.

In the thus prepared loaf bread, the dietary fiber derived from the porridgelike ground product was contained in an amount of ca. 3 g (dried weight), per 100 g of bread.

For the purpose of comparison, a loaf bread (control) was prepared in the same manner as above, except that water was used in place of the porridgelike ground product, and the properties of the two breads were compared.

The bread according to the invention assumed a slightly grayish white color, whereas the control bread was white. There were however no substantial differences between the two breads in their mouthfeel, taste, uniformity in cavity and appearance, and the bread according to the invention was no inferior to the control.

With regard to specific volume (ml/g), the bread according to the invention was superior to the control; the former had a specific volume of 6.56 just after baking and 6.00 after being cooled, whereas the latter had 5.80 and 5.76, respectively. This shows that the resilience of bread can be improved by the addition of the porridgelike ground product according to the invention.

In a test, 9 adult panelists who usually evacuate 2 to 3 times a week (Group A) and the same number of adult panelists who usually evacuate 4 to 7 times a week (Group B) were fed with 100 g/per meal of the loaf bread according to the invention twice a day for 2 weeks. The evacuation time of the panelists increased to 4 to 7 times a week (Group A) and 5 to 9 times a week (Group B). This proves that the porridgelike dietary fiber according to the invention is capable of relieving constipation.

The dietary fiber derived from beet roots in accordance with the invention is not different in components from hitherto known dry powdery dietary fibers derived from beet roots. However, the dietary fiber according to the invention is prepared by finely grinding beet pulp in a wet state and is rendered to a porridgelike state, and the size of fibers contained therein is smaller than that of those according to prior arts. The dietary fiber according to the invention is therefore apparently different as a substance from prior dietary fibers.

Due to the difference in physical properties, the porridgelike dietary fiber according to the invention can be readily admixed with various foodstuffs, compared with cases of prior dietary fibers, and the mouthfeel of foods containing the dietary fiber according to the invention can be so smooth and uniform that no one feels the presence of the foreign beet dietary fiber. In addition, the dietary fiber can be free from the slight odor characteristic of beet roots and hence can improve the taste of various foods. The invention is therefore highly useful in that it can contribute to the maintenance of human health by providing foods containing dietary fibers in increased quantities.

What is claimed is:

1. A porridgelike dietary fiber in a smooth viscous state prepared by removing most of water-soluble components from beet roots to form wet beet root pulp, and subjecting the pulp in water in the range of 90 to 99% to fine grinding to form finely ground dietary fiber associated with water.

2. A porridgelike dietary fiber in a smooth viscous state as claimed in claim 1, wherein said finely ground fiber is uniformly dispersed in water.

3. A food product having added porridgelike dietary fiber in a smooth viscous state prepared by removing water-soluble components from beet roots to form wet root pulp subjecting the pulp to fine grinding.

4. A method of producing porridgelike dietary fiber in a smooth viscous state, comprising the steps of:
   a) removing water-soluble components from pieces of beet roots to form wet beet root pulp; and
   b) fine grinding the pulp in a state where the content of water in the grinding system is maintained at 90 to 99%.

5. A method producing a porridgelike dietary fiber in a smooth viscous state as claimed in claim 4, wherein said beet root pulp is subjected to dehydration or drying and redispersed into water before it is subjected to find grinding as in Step b).

6. A method of producing porridgelike dietary fiber in a smooth viscous state as claimed in claim 4, wherein said fine grinding is effected by using a grinder adjusted at a gap of 1 to 30$\mu$m.

7. A method of producing porridgelike dietary fiber according to claim 4, comprising first coarsely grinding a sugar beet root material to form coarse particles and extracting the sugar from said coarse particles to form said pieces of beet roots, and subsequently removing water-soluble components and fine grinding said pulp in a state where the content of water in the grinding system is maintained at 90 to 99%.

* * * * *